United States Patent [19]

Watson

[11] Patent Number: 5,034,759
[45] Date of Patent: Jul. 23, 1991

[54] PHOTO DEVICE

[76] Inventor: Ronald Watson, 117 Goldgate Crescent, Orangeville, Ontario, Canada, L9W 4B8

[21] Appl. No.: 442,140
[22] Filed: Nov. 28, 1989
[51] Int. Cl.⁵ ............................................. G03B 29/00
[52] U.S. Cl. ..................................... 354/67; 354/70; 354/74
[58] Field of Search ..................... 354/65, 67, 70, 74, 354/81, 73

[56] References Cited

U.S. PATENT DOCUMENTS

| | | | |
|---|---|---|---|
| 367,610 | 8/1887 | Fairman | 354/74 |
| 578,980 | 3/1897 | Eddy | 354/74 |
| 894,348 | 7/1908 | Seele | 354/74 |
| 1,002,897 | 9/1911 | Brown | 354/74 |
| 1,301,967 | 4/1919 | Parks | 354/74 |
| 3,485,151 | 9/1967 | Taylor | 354/74 |

Primary Examiner—Michael L. Gellner

[57] ABSTRACT

An aerial still camera including: a video camera; a device for elevating the video camera relative ground level; structure for suspending the video camera from the elevating device; first self-levelling structure for levelling the video camera in a first direction; second self-levelling structure for levelling the video camera in a second direction; first drive structure for rotating the video camera to control the image scanned by the video camera along a first axis; second drive structure for rotating the video camera to control the image scanned by the video camera along a second axis; a tether attached at one end to the elevating device for holding the elevating device and the video camera in the elevated position, the tether including electrical conductors; and an electrical control device attached at another end of the tether for controlling the first and second drive structure so as to control the image scanned by the video camera, the control structure further including a video display so to display the image scanned by the video camera. The electrical device also includes a still camera shutter activating device for activating the still camera when the video display displays a desired view from the video camera.

20 Claims, 9 Drawing Sheets

PHOTO DEVICE

FIELD OF INVENTION

This invention relates to an aerial viewing device and particularly relates to an aerial still camera suspended from a helium balloon which includes a video camera with a display for displaying a view capable of being photographed by the still camera; and includes means to transmit or record the video image.

BACKGROUND OF THE INVENTION

Aerial photography basically relates to the art and science of photographing objects from an elevated position.

Aerial photography is a useful tool in photographing objects or terrain from an elevated position and has been used by engineers and scientists to map out particular regions as well as being used by artists to photograph objects such as homes or the like.

Furthermore aerial viewing devices such as video cameras, or television cameras have also been elevated in an effort to record action shots for television production services as well as being used for search missions in the event when a person has become lost in a forest, wilderness or the like.

Such aerial viewing devices or aerial cameras have been mounted or suspended from airplanes in order to accomplish the desired result. However, such airplanes travel at a relatively fast speed and are subject to the vibrational forces so that it becomes difficult to photograph a suitable picture or to display onto a video camera display unit a suitable image having high resolution qualities.

Various devices have been constructed, and various methods have been employed in order to improve the resolution of images displayed or photographs taken from aerial devices.

For example U.S. Pat. No. 359,902 discloses an aerial photographic apparatus suspended from a balloon.

Moreover U.S. Pat. No. 367,610 discloses apparatus for aerial photography from a high altitude without the necessity of the presence of an operator.

Yet other devices are disclosed by U.S. Pat. No. 510,759 relating to aerial cameras.

U.S. Pat. No. 578,980 shows the use of devices designed to be secured to a kite string to support one or more photographic cameras whereby negatives of the surroundings may be taken at a great altitude.

Furthermore, U.S. Pat. No. 1,528,933 relates to a kite adapted to support an aerial camera.

Finally, U.S. Pat. No. 3,638,502 illustrates a stabilized camera mount for compensating erratic movements of vehicles.

These and other prior art devices present relatively complicated structures and are difficult and expensive to use for viewing terrain from an elevated position as well as difficult and expensive to use to photograph terrain from an aerial camera.

It is an object of this invention to provide an improved aerial viewing device and particularly to disclose an improved aerial camera for photographing the desired view or terrain.

The broadest aspect of this invention relates to an aerial viewing device including; a video camera; structure for elevating said video camera relative ground level; structure for suspending said video camera from said elevated device; first self-leveling structure for leveling said video camera in a first direction; second self-leveling structure for leveling said video camera in a second direction; first drive structure for rotating said video camera to control the image scanned by said video camera along a first axis; second drive structure for rotating said video camera to control the image scanned by said video camera along a second axis; a tether attached at one end to said elevating structure for holding said elevating structure and said video camera in said elevating position, said tether including an electrical conductor; and electrical control structure attached at another end of said tether for controlling said first and second drive structure so as to control the image scanned by said video camera, said control structure further including a video display so as to display said image scanned by said video camera.

It is another aspect of this invention to provide an aerial camera including; a helium balloon; a gimbal frame suspended from said balloon; a camera mounting structure suspended from said gimbal frame; a still camera carried by said camera mounting structure; a video camera carried by said camera mounting structure; said gimbal frame including, first self-leveling structure for leveling said camera mounting in a first horizontal position, second self-leveling structure for leveling said camera mounting structure in a second horizontal position; first drive structure carried by said gimbal frame for rotating said camera mounting structure and said still camera and for rotationally controlling the image scanned by said video camera along a vertical axis; second drive structure associated with said camera mounting structure for rotating said camera structure, said still camera, and for rotationally controlling the image scanned by said video camera along a horizontal axis; a tether attached at one end to said helium balloon for holding said helium balloon in said elevated position, said tether including electrical conductors; and electrical control structure attached at said other end of tether for controlling said first and second drive structure so as to control the image scanned by said video camera, said control structure including, a video display for displaying said image scanned by said video camera, and a shutter activating structure to activate said still camera when said video display displays a desired view from said video camera.

Yet another aspect of this invention relates to an aerial camera including; a helium balloon; a gimbal frame suspended from said balloon; a first pair of gimbal wires depending from said gimbal frame; a first motor housing presenting first apertures adapted to receive said first pair of gimbal wires for relative slidable movement therebetween, said first motor housing presenting first nylon slip bearings pivotally connected adjacent each set aperture for relative slidable movement therebetween so as to self-level said first motor housing in a first horizontal direction; a camera mounting structure; first drive structure carried by said first motor housing; structure for connecting said camera mounting structure to said first drive structure so as to rotate said camera mounting structure along a vertical axis when driven by said first drive structure; said connecting structure including a pair of second gimbal wires; second nylon slip bearings pivotally connected to said camera mounting structure and adapted to slidably receive said second pair of gimbal wires for relative slidable movement there between so as to self-level said camera mounting structure in a second horizontal position; a still camera connected to said camera mounting structure; a video camera mounted to said camera mounting structure; second drive housing associated with said camera mounting structure for rotating said still camera and said video camera along a horizontal axis; a tether attached at one end to said helium balloon for holding said helium balloon in an elevated position, said tether including electrical conductors; and electrical control structure attached at said other end of said tether for controlling said first and second drive structure so as to control the image scanned by said video camera, said control structure including, a video display for displaying said image scanned by said video camera, and a shutter activating structure to activate the still camera when said video display displays a desired view from said video camera.

Finally, it is another aspect of this invention to provide a self-leveling device for suspending an aerial camera including, a gimbal frame adapted to be attached to an elevating device; a first pair of gimbal wires depending from said gimbal frame; a first housing presenting first apertures adapted to receive said first pair of gimbal wires for relative slidable movement there between, first nylon slipped bearings to be connected adjacent each said apertures and adapted to receive said first pair of gimbal wires for relative slidable movement there between so as to self-level said first housing in a first horizontal direction; a camera mounting structure for mounting said aerial camera; a connector for connecting said camera mounting structure to said first housing; a second pair of gimbal wires depending from said connector; second nylon slipped bearings pivotally connected to said camera mounting structure and adapted to slidably receive second pair of gimbal wires for relative slidable movement therebetween so as to self-level said camera mounting structure in a second horizontal position.

These and other objects and features shall now be described in relation to the following drawings:

DETAILED DESCRIPTION OF THE INVENTION:

Like parts have been given like numbers throughout the figures.

Figure 1:
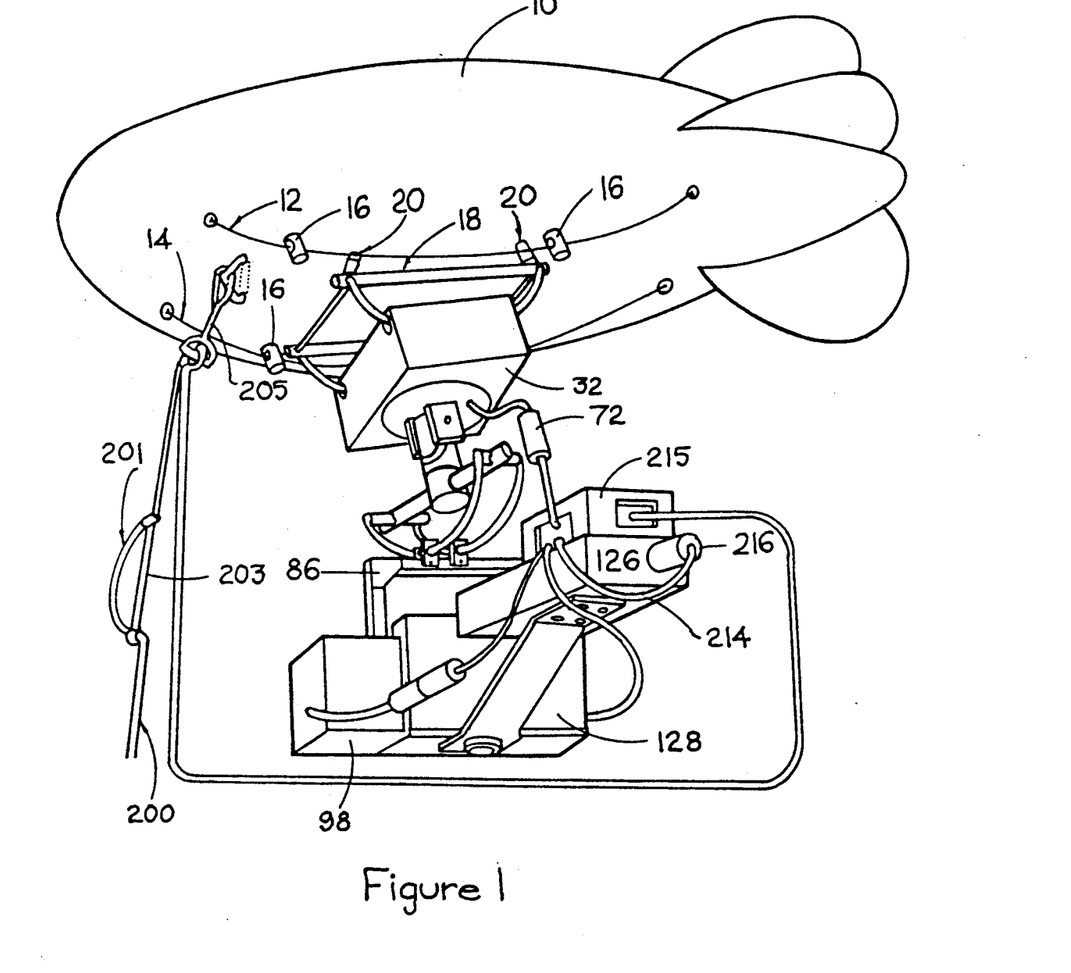
FIG. 1 is a side elevational perspective view of said aerial camera.

FIG. 1 illustrates the aerial camera which includes a helium balloon 10, first housing or first motor housing 32, a camera mounting structure 86, adapted to carry still camera 128, and video camera 126.

The camera mounting 86 also carries second motor housing 98. Furthermore, FIG. 1 also illustrates the tether line 200.

More particularly, FIG. 1 illustrates the helium balloon 10 has two cords 12 and 14 which run longitudinally along the underside of the helium balloon 10. The ends of cords 12 and 14 respectively are secured to the helium balloon.

Four spring loaded tension anchoring clamps 16 are attached to the cords 12 and 14 and permit the gimbal frame 18 which is connected to cords 12 and 14 by means of wire spring clips 20 so as to freely slidably move along the cords 12 and 14 between tension anchoring clamps 16.

Figure 2:
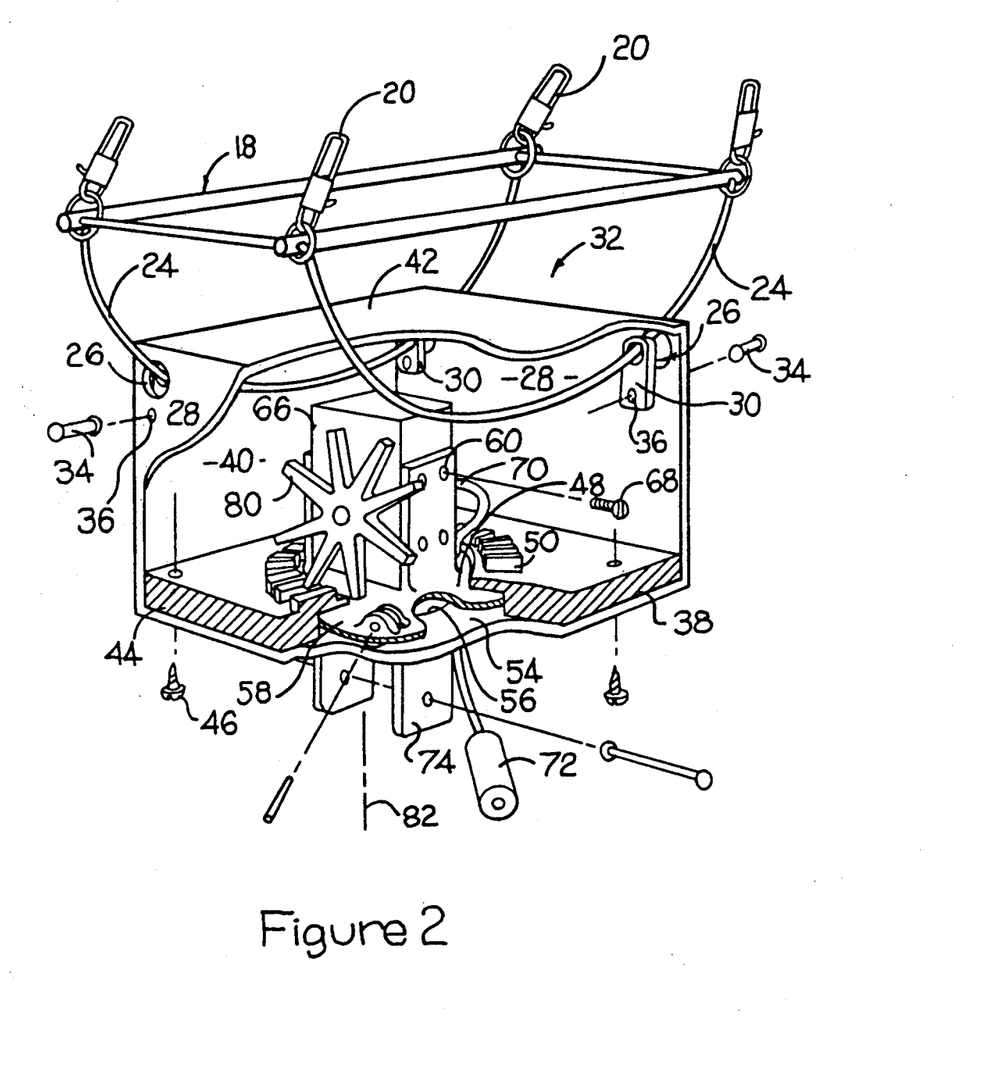
FIG. 2 is a partial cross sectional view of said first motor housing.

FIG. 2 illustrates in more detail the gimbal frame 18 and first motor housing structure 32.

The first motor housing 32 is generally boxed shaped and is suspended from two arched shaped gimbals 24 which pass through openings or apertures 26 presented in the upper outer corners of the end walls 28 of the first motor housing 32.

Furthermore, four first nylon slip bearings 30 are pivotally connected adjacent the apertures 26. The first nylon slip bearings 30 are tabular shaped with an opening in one end which is adapted to receive the arched shaped gimbal wires 24 to pass through easily so as to minimize any snagging of the first pair of gimbal wires 24 with the aperture or first nylon slip bearings 30 and thereby permit the first motor housing to be self-leveled along a first direction.

Furthermore, the first nylon slip bearings 30 include a second hole or aperture 36 located at the opposite end and adapted to receive a bearing pin 34. The bearing pin 34 is adapted to be received in aperture 36 located in the end walls 28 for securement thereto.

Accordingly, the first slip bearings 30 are pivotally secured to said end walls 28. The pivoting action of the first nylon slip bearings 30 minimizes any snagging or braking action which may occur when the first pair of gimbal wires 24 slide relative said first nylon slip bearings 30 particularly when turbulence is encountered while the aerial device is in flight.

The first motor housing 32 is configured as a box and may be constructed of plastic or the like. In particular the first drive motor housing 32 includes an outer floor 38 a pair of end walls 28 and a pair of sidewalls 40 along with a removable top 42. The first motor housing 32 also includes an inner platform 44 which is secured to the floor 38 by means of self-tapping screws 46.

The platform 44 includes a circular opening 48 which is concentrically encircled by a plurality of first gears 50 which are presented by or connected to the upper surface of the platform 44 as best illustrated in FIG. 2.

Furthermore, a circular recess 54 which is slightly larger in diameter than opening 48, is located in the lower part of platform 44. The floor 38 includes a circular opening 56 which is concentric with hole 48.

Once the platform 44 is secured to floor 38 by means of self-taping screws 46 the recess 54 presents or defines a circular shaped race. This defined race or recess 54 is adapted to receive the circular base 58 of motor mounting bracket 60 which may be best illustrated in FIG. 3.

Figure 3:
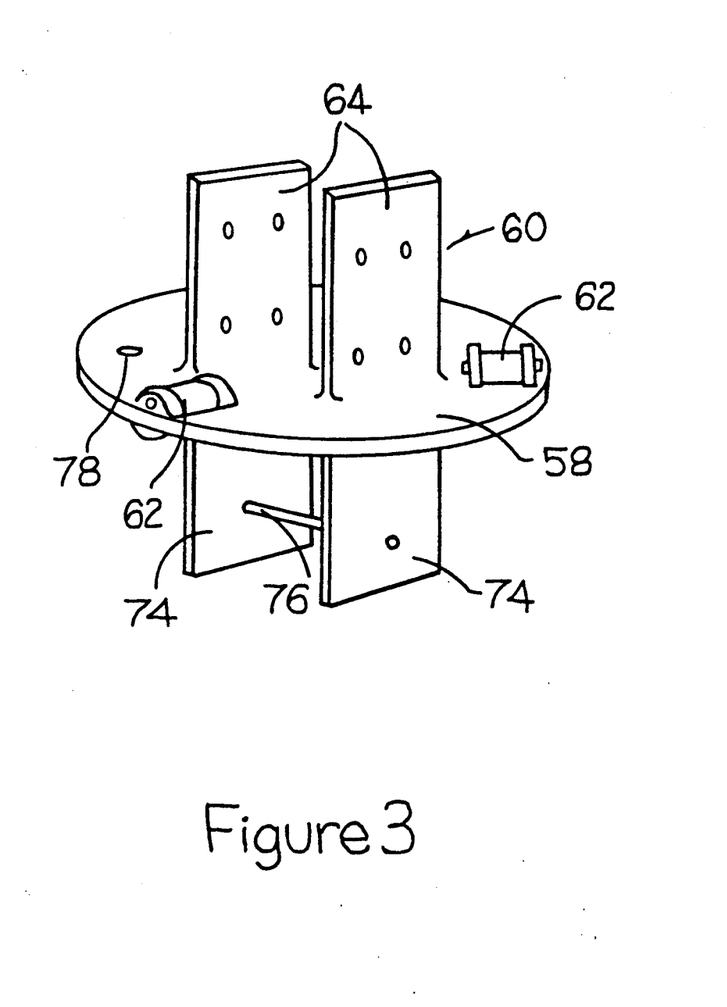
FIG. 3 is a perspective front elevational view of a motor mounting bracket.

The motor mounting bracket 60 includes three roller bearings 62 which are disposed at equally distant points on the circular base 58 of motor mounting bracket 60.

Two flat wings or legs 64 extend vertically upwardly at right angles from the circular base 58 of the motor mounting bracket 60. The legs 64 are adapted to embrace or cradle the size of the box like first motor 66. The first motor 66 consists of a direct drive motor. The legs 64 are held in place to receptacle 66 by means of screws 68.

Furthermore, the direct current motor receives power by means of two electrical conductor wires 70 which extend through openings 48 and 54. The ends of electrical conductor 70 include a quick connect and disconnect device 72 as best illustrated in FIG. 2.

A second pair of wings or legs 74 also extend vertically downwardly at right angles from the circular horizontal base 58 as best illustrated in FIG. 3. The legs 74 are disposed in generally flat parallel relationship and are adapted to receive a horizontally disposed support pin 76 which is permanently held therebetween as best illustrated in FIG. 3.

The circular base 58 of motor mounting bracket 60 presents a hole 78 which is adapted to receive therethrough electrical conductors 70. The electrical conductors 70 is connected to the direct current drive motor 66 and terminates with a quick connect or disconnect jack 72.

The bearings 62 are adapted to minimize the frictional rotation of the motor mount 60 with the race defined by the recess 54 of platform 44.

The first drive motor 66 is connected to first sprocket 80 as best illustrated in FIG. 2. First sprocket 80 is adapted for engagement with first gear 50. When the first motor 66 is energized (in a manner which will be more fully described herein) the first motor rotationally drives first sprocket 80 which engages first gear 50 and accordingly the first motor mounting bracket 60 rotates about a first axis 82 which is perpendicular to platform 44. In particular, first axis 82 presents a vertical axis.

It should be noted that first motor 66 contains a series of gears in a gear box (not shown) so as to increase the torque of the device in a manner which is well known to those persons skilled in the art.

The circular opening 56 in platform 44 allows the upper legs 64 which embrace first motor 66, to rotate as well as the lower legs 74. The entire motor mounting bracket 60 is supported by the roller bearings 62 which are held in position by the overlapping section of the platform 44 as well as the engagement of first sprocket 80 with first gears 50.

The lower legs 74 can carry a load and adequately function even if the entire first motor housing 26 is not level with the horizon.

Figure 4:
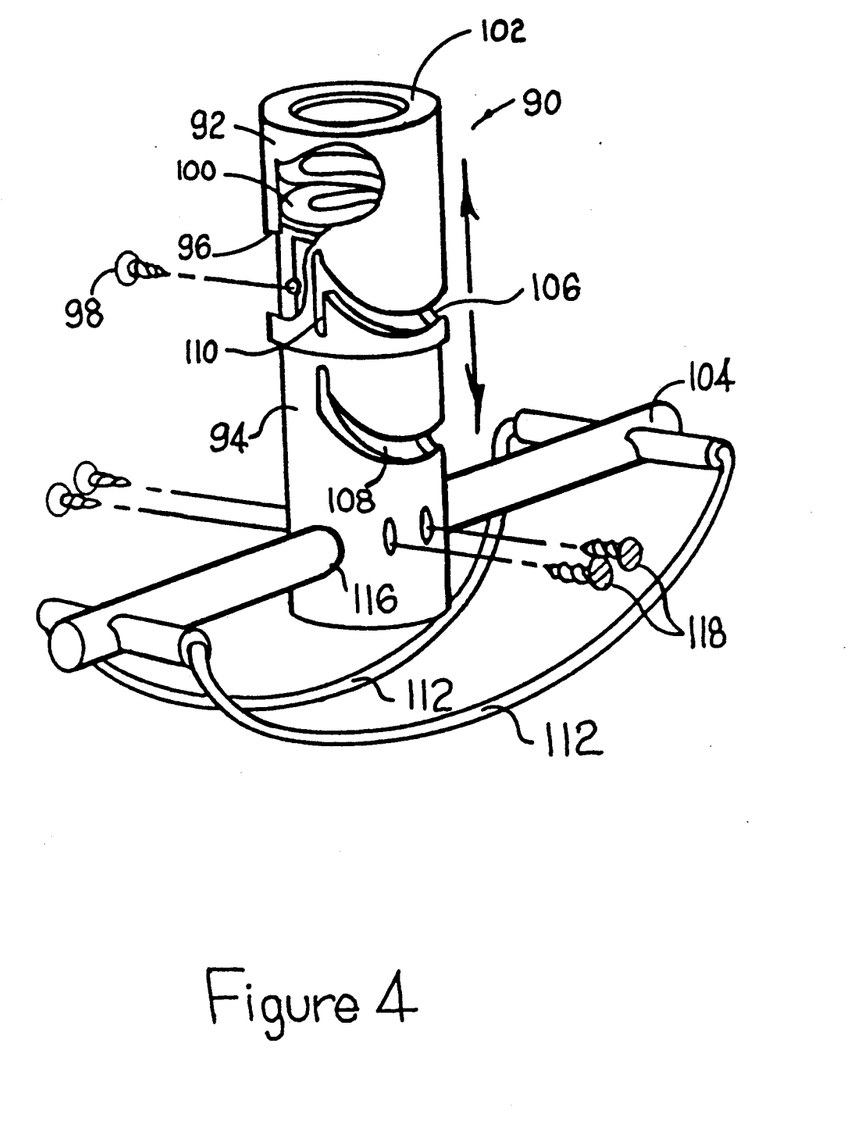
FIG. 4 is a perspective view of the connector for connecting the camera mounting to the first motor housing.

A quick connect and disconnect connector 90 is best illustrated in FIG. 4. Connector 90 includes two hollow cylindrical sleeves or tubes 92 and 94. More particularly, upper tube 92 is adapted to telescope over lower tube 94. The upper tube 92 includes a vertical slot 96 through which self-tapping screw 98 is inserted and screwed into the side of lower tube 94.

Figure 5:
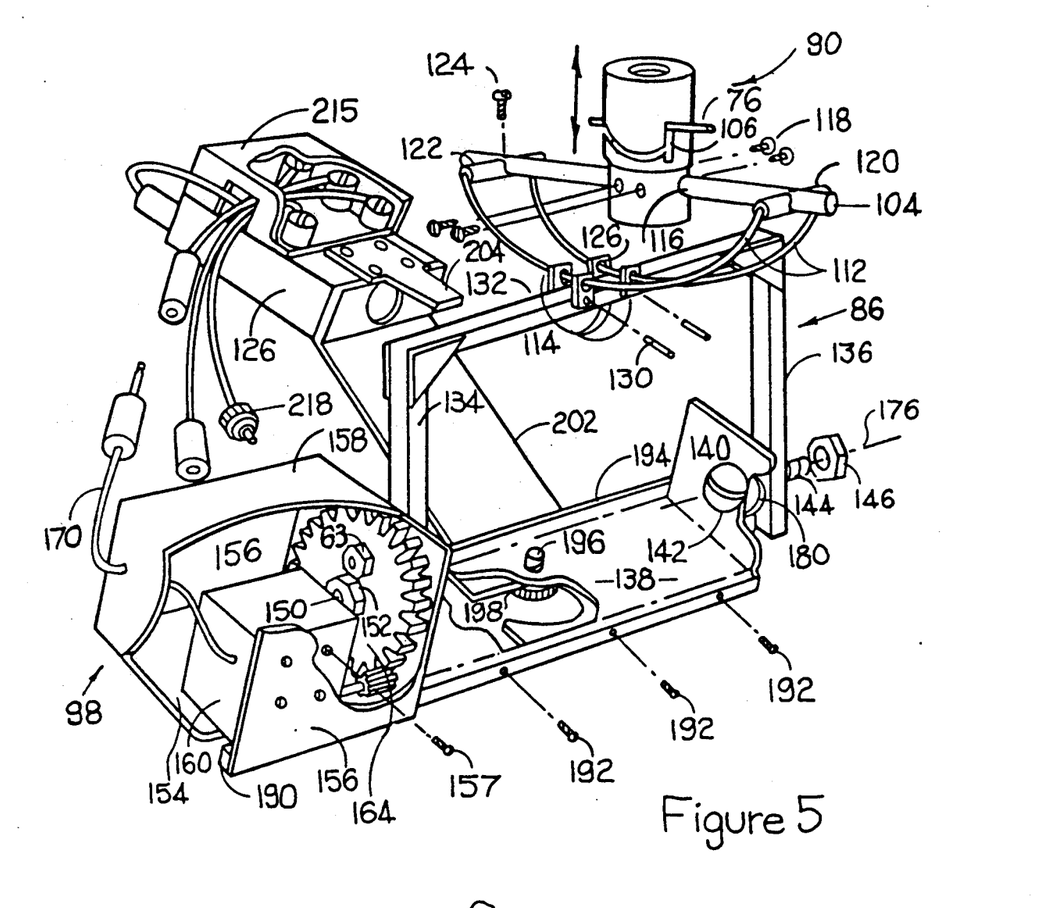
FIG. 5 is a partial perspective and cut away view of the camera mounting.

By applying upward pressure to the base of lower tube 94 and holding upper tube 92, upper tube 92 telescopingly slides over tube 94 since tube 94 is slightly smaller in diameter than upper tube 92. A coil spring 100 is located inside hollow tubes 92 and 94 and is adapted to urge said tubes 92 and 94 in a closed or locked position as best illustrated in FIG. 5. FIG. 4 illustrates the tubes 92 and 94 in an unlocked position.

Upper tube 92 includes a restraining flange 102 so as to prevent said compression spring from escaping. Furthermore, compression spring 100 is held in place relative the lower tube 94 by a suitable restraining flange (not shown).

Upper and lower tubes 92 and 94 include curved slots 106 and 108 respectively.

Accordingly, the user of the aerial camera may connect the connector 90 to the first motor housing 32 by grasping lower tube 94 and compressing compression spring 100 so as to cause the first tube to telescopingly slide over second tube 94 to align slots 106 and 108 which are adapted to receive securing pin 76 of motor mounting bracket 60. First slot 106 also includes a detent slot 110 so that as the pressure of the user is released, upper tube 92 slides upwardly when viewing FIG. 5 so as to capture the securing pin 76. The slots 106 and 108 are disposed in an angular direction of approximately 45° to the vertical axis of the tubes 92 and 94.

Lower tube 94 presents a second pair of gimbal wires 112 in a manner to be more fully described herein. Furthermore, the second pair of gimbal wires 112 are connected to camera mounting structure 86 by means of second nylon slip bearings 114 in a manner to be more fully described herein.

Therefore, the connection of the second pair of gimbal wires 112 as well as the camera mounting structure 86 is accomplished by inserting the support pin 76 through slots 106 and 108 of the upper and lower tubes 92 and 94 respectively while tubes 92 and 94 are telescopingly compressed together. The support pin 76 is permitted to travel along the path of the curved slots 106 and 108 until it is located in the end of the slots whereby the pressure may be released from compression spring 100 and the upper tube 92 permitted to travel slightly upwardly relative lower tube 94 so as to capture the pin 76 in detent 110.

Reversing the above procedure allows the removal of the camera mounting structure 86 and second pair of gimbal wires 112 from the first motor housing 32 as well as the first pair of gimbal wires 24. Then the connector 90 is locked onto the support pin 76 the lower leveling gimbal wires 112 are safely suspended and are capable of swinging onto the support pin 76 in a pivoting action.

A plastic or fiberglass rod 104 of smaller diameter than lower or inner telescoping tube 94 runs perpendicularly through holes 116 in the peripheral wall of inner telescoping tube 94 at right angles as best illustrated in FIG. 5. Rod 104 may be comprised of plastic or the like and is held in place relative to lower tube 94 by means of screws 118 which pass through the peripheral walls of the inner telescoping tube 94. Rod 104 presents at one end thereof a hollow tube 120 which is smaller in diameter from rod 104 and at the other end thereof a rod 122 which is also smaller in diameter from rod 104. Tube 120 and rod 122 are disposed generally at right angles relative rod 104. Tube 120 may be press fit into rod 104 or secured thereto by means of glue. The smaller diameter rod 122 is secured to rod 70 by means of a screw 124. A wire is fed through tube 120 and bent so as to present a pair of second gimbal wires 112. The other end of gimbal wires 112 are wrapped around rod 122, inserted into the ends of hollow rod 122 or folded back upon themselves to lock in place. Second gimbal wires 112 are arc shaped and are generally disposed parallel to one another.

The second pair of gimbal wires 112 are adapted to be received by second nylon slip bearings 114 in a manner to be described herein. More particularly, second nylon slip bearings 114 present apertures 126 at one end thereof adapted to receive said second pair of gimbal wires 112. Another end of said second nylon slip bearings present an aperture 128 adapted to receive pins 130 which are secured to camera mount structure 86. Second nylon slip bearings are adapted to pivot about pins 130.

Second gimbal wires 112 and second nylon slip bearings 114 define a second self-leveling means; while said first pair of gimbal wires in combination with said first nylon slip bearings 30 define first self-leveling means.

Pins 130 prevent the second nylon slip bearings from binding on the second pair or gimbal wires 112.

FIG. 5 also illustrates that camera mounting structure 86 includes an upper frame 132 connected at opposite ends to side frames 134 and 136 respectively. Camera mounting structure 86 also includes lower camera mounting platform 138 which is associated with side frame 134 in a manner to be more fully described herein. The other end of lower camera mounting platform 138 adjacent the side frame 136 terminates in an upwardly projecting portion 140.

Portion 140 is drilled to present an aperture 142 which is adapted to receive a pivot bolt 144 which is also adapted to be received by a suitable aperture (not shown) located in side frame 136. The other end of pivot bolt 144 is adapted to receive nut 146.

Camera mounting structure 86 carries second motor housing structure 98 which is box shaped and comprises floor 154 connected to four sides 156 and a top 158.

Figure 6:
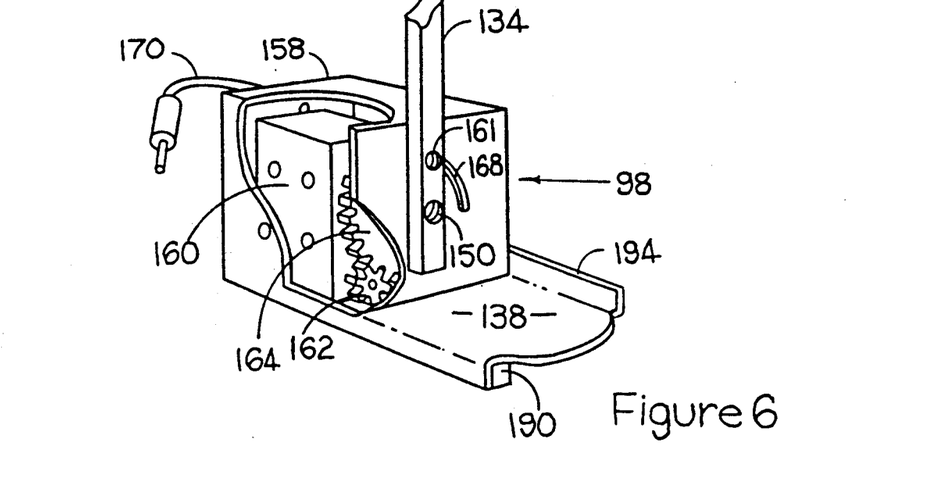
FIG. 6 is a side elevational view of said second motor housing.

As best illustrated in FIG. 6, side frame 134 of camera mounting structure 86 is secured to one side 156 of second motor housing 98 by means of screws 150 which protrudes through one side 156 and second gear wheel 164 and anchored thereto by bolt 63. Furthermore a second screw or bolt 161 is received by a hole in side FIG. 134 and by another hole in gear wheel 164 and secured thereto by nut 63 in a manner so that second motor housing structure can rotate as bolt 161 travels in slot 168.

Second motor housing 98 houses second motor 160, second sprocket 162 and second gear wheel 164.

Second motor 160 is secured to one sidewall 156 by means of screws 157.

Second motor 160 presents an opening to receive two electrical conductors 170.

Second motor 160 is connected to second sprocket 162 which is adapted to engage the teeth located in the perimeter of second gear wheels 164.

When direct current is applied by means of conductors 170 to the second motor drive 160, this causes second gear wheel 164 to rotate and travel about second sprocket 162.

Accordingly, as second motor 160 activates second sprocket 162 thereby causing second sprocket 162 to engage teeth in second gear 164 thereby causing the second motor housing 98 to rotate about a second axis 176 defined by said bolt 144. This causes the lower camera mounting platform 138 to pivot about the second or horizontal axis 176.

FIG. 6 illustrates that the lower camera mounting platform 138 is an extension of or connected to floor 154 of second motor drive housing 98.

In other words, when second motor is activated, sprocket 162 rotates second gear wheel 164 and the lower camera mounting platform is displaced in relation to frames 128, 134, and 136. Accordingly, the lower camera mounting platform 138 will either tilt forwardly or backwardly relative to the frames 132, 134, and 136 depending upon the direction of flow of current passing through conductors 170.

The lower camera mounting platform 138 moves without slippage as a result of surface tension supplied by a rubber washer or gasket 180 which is placed concentric with the pivot bolt 142 between portion 140 and side frame 136.

Reinforcing member 190 extends along the bottom lip of lower camera mounting platform 138 which is bent downwardly 90° as well as extending along the underside of floor 154 of second motor drive housing 98 in order to rigidify and strengthen same. Reinforcing member 190 is secured to the lower camera mounting platform 138 and floor 154 by means of screws 192.

The lower camera mounting platform 138 in the preferred embodiment is an extension of wall 156 of second motor drive housing 98 which has been folded outwardly 90°. Alternatively, lower camera mounting platform may be comprised of a separate piece of sheet metal which is suitably attached to second motor drive housing 98.

Furthermore, lower camera mounting platform 138 is folded upwardly to present a rear position ledge 194 for the installation of a still camera 128. The rear position ledge 194 also tends to rigidify and strengthen the lower mounting platform 138.

Lower camera mounting platform 138 presents a circular opening 196 which is adapted to receive camera mounting screw 198 of the type usually found in camera tripods.

Screw 198 extends through opening 196 and through a hole in the foot of the video camera mounting bracket 202 and into the threaded opening located in the base of still camera 128 for the purpose of securing still camera 128, video camera mounting bracket 202 to the lower camera mounting platform 138.

A video camera 126 is secured to the other end of video camera mounting bracket 202 with the lens of the video camera 126 adjacent to or in line with the viewfinder of the still camera 128 so that the image viewed by video camera 126 is substantially the same as the image viewed by the viewfinder of the still camera 128.

The video camera 126 is held in place or secured to the video camera mounting bracket 202 by means of screws or the like.

A video camera positioning tab 204 or device conforming to the configuration of still camera 128 is attached to the surface of the video camera 126 and is orientated so as to allow the forward edge of positioning tab 204 to be inserted into the flash shoe of the still camera 128 or anchor to the camera body. The exact manner of anchoring the video camera to the still camera whether by positioning tab 204 or other fastening tab will depend on the configuration or make of the still camera and video camera.

Accordingly, tab 204 or similar device in combination with the video camera mounting bracket 202 holds or secures the lens of the video camera 126 in alignment with the still camera 128 viewfinder.

Figure 7:
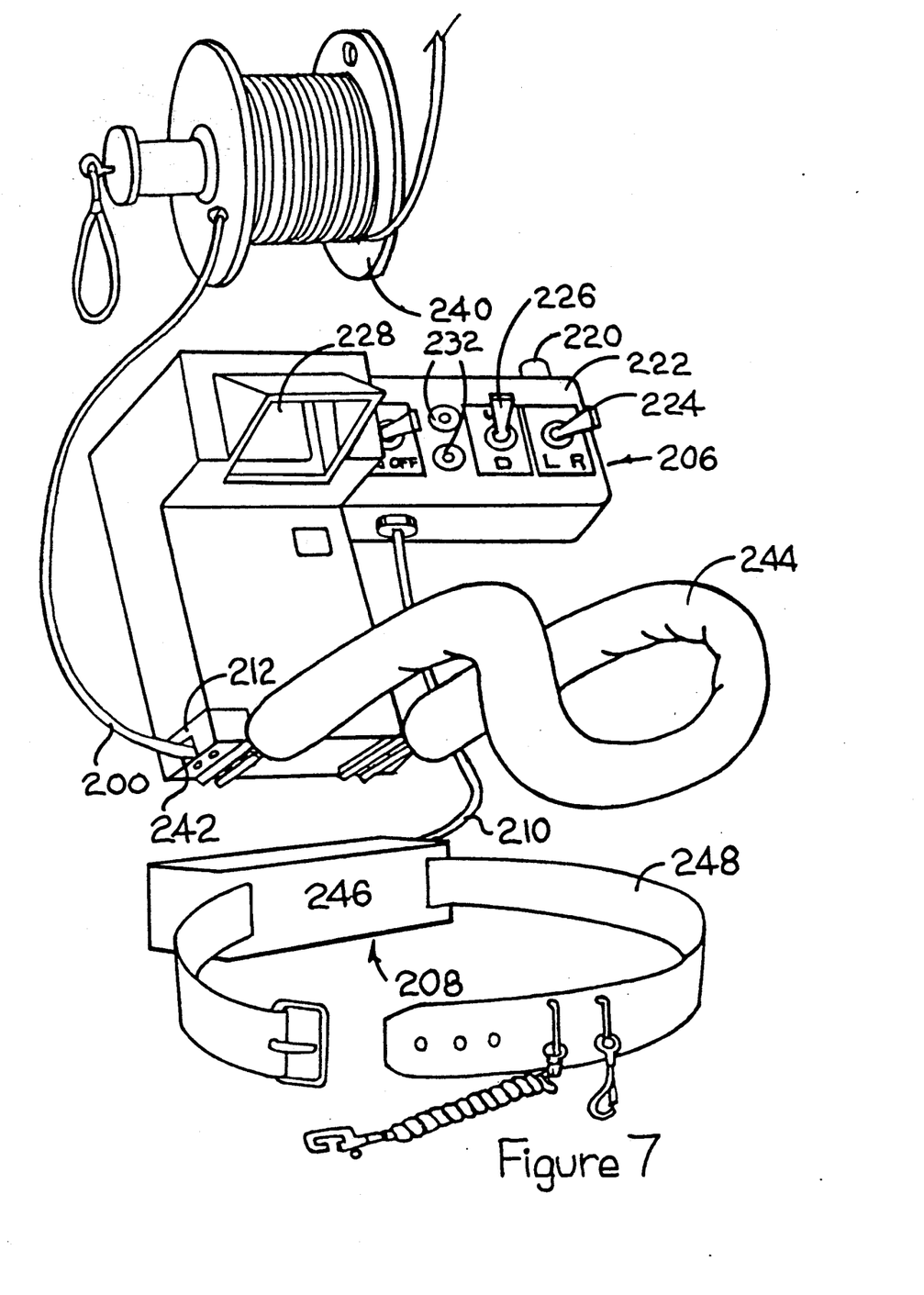
FIG. 7 is a side elevational and perspective view of the tether line, shoulder harness, and battery pack.
Figure 8A:
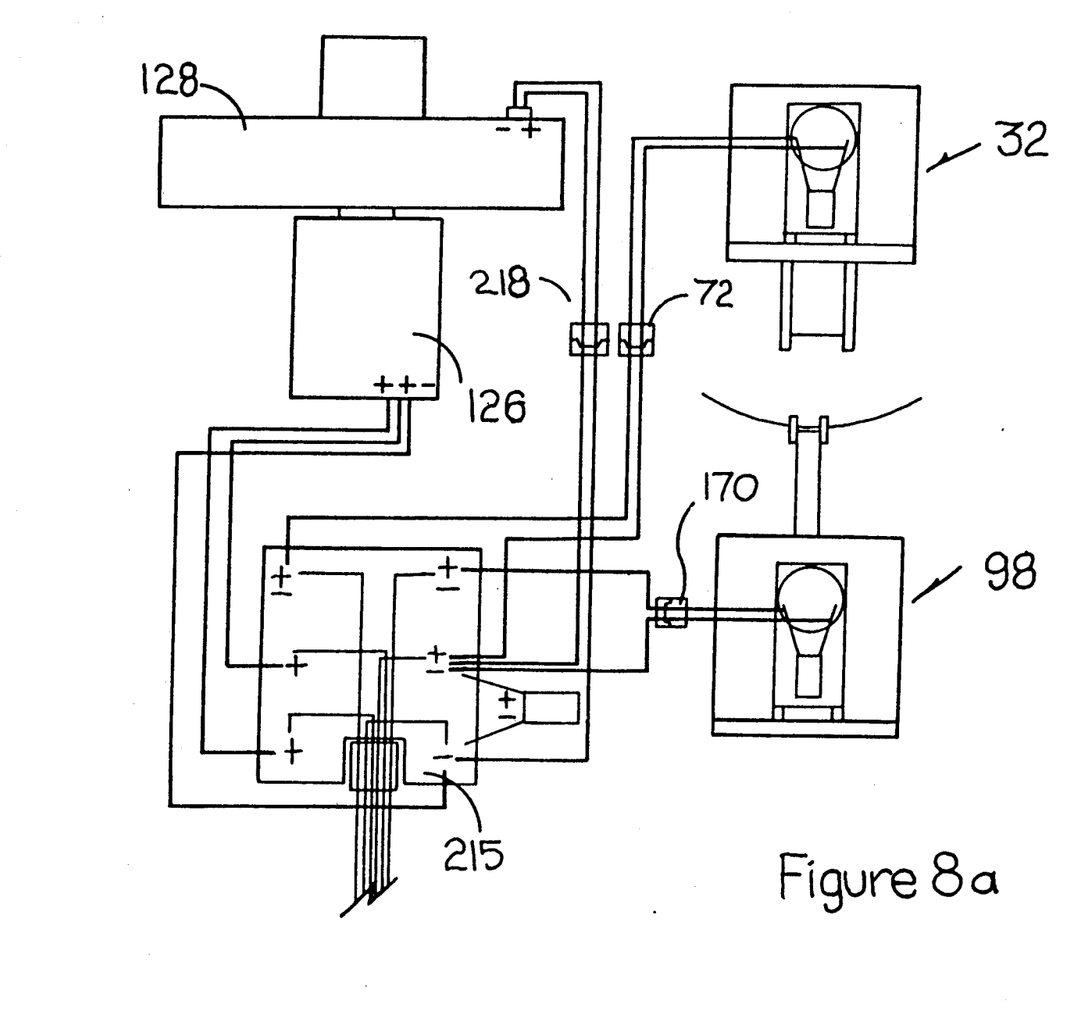
FIGS. 8a and 8b show the electrical schematic diagram.
Figure 8B:
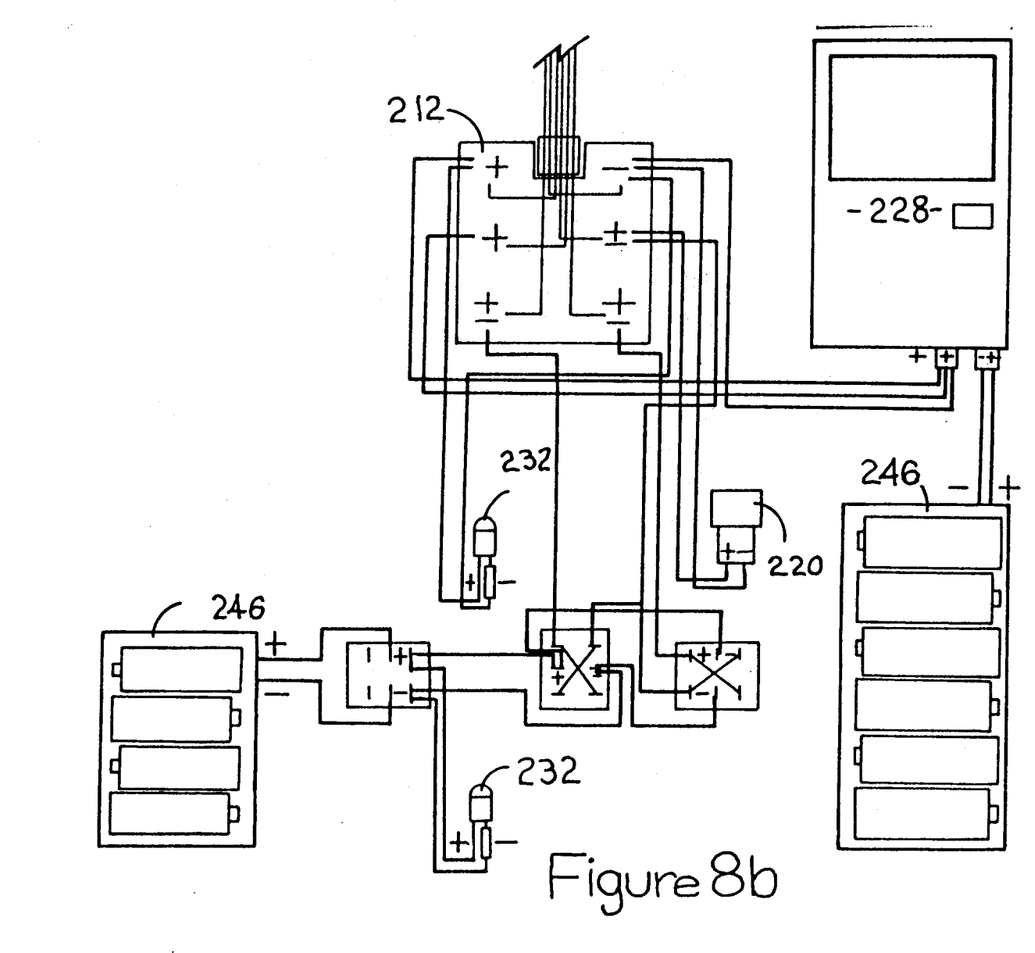
Figure 9:
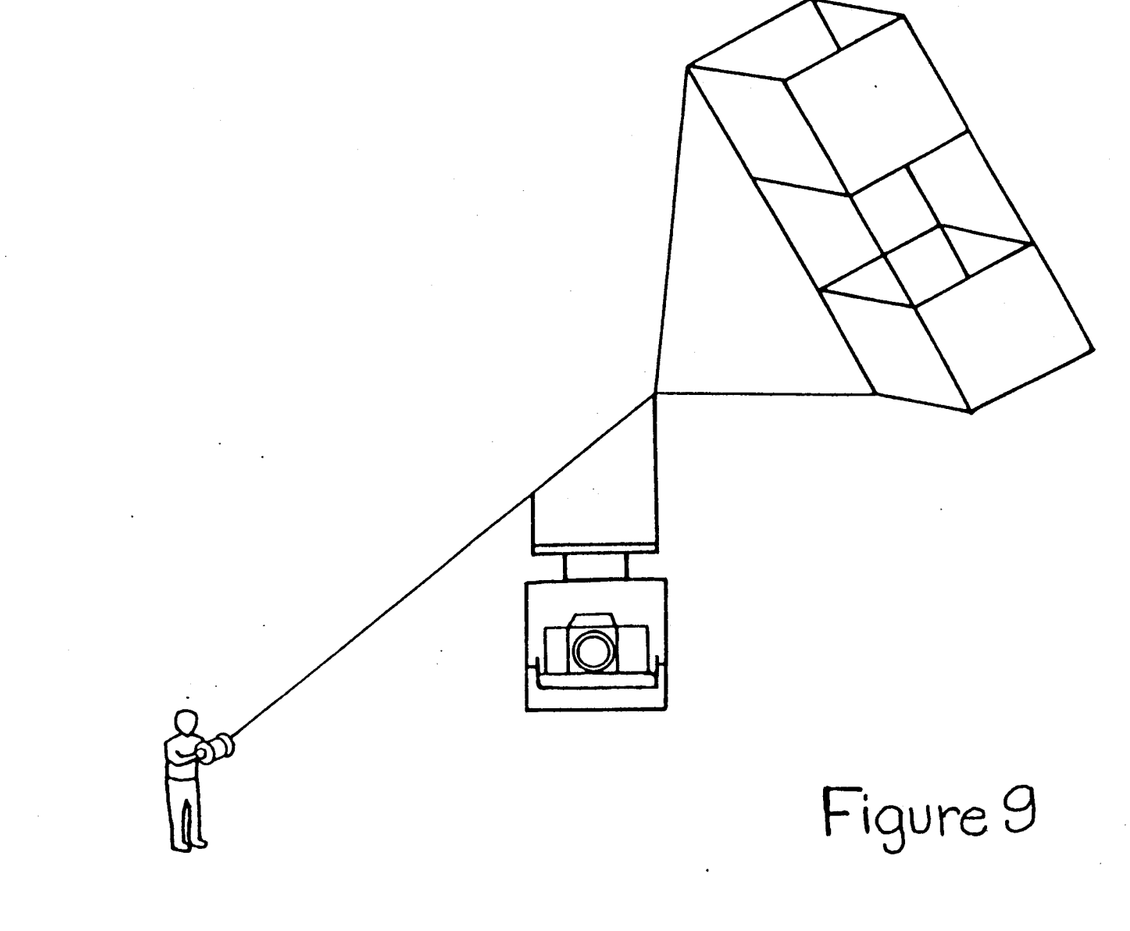
FIG. 9 shows the use of the aerial camera with a kite.

FIG. 7 illustrates the tether line 200 shoulder mounted control panel 206 and power pack 208.

Electrical power from the power pack 208 is supplied by means of electrical conductor 210 into electrical junction box 212. Electrical power from electrical junction box 212 is then supplied to the video camera 126 by means of electrical conductor 214 through electrical junction box 215 by means of electrical jack 216.

A still camera electronic shutter release cable 218 is fastened to a suitable terminal in the junction box 215 and is inserted into the appropriate receptacle provided in the still camera 128 for the purpose of activating the shutter.

The shutter of still camera 128 is electrically connected to the control device 206 by means of shutter release cable 218, junction box 215 connected to tether line 200 through junction box 212 into control panel 206 through conductor 217 (not shown) which in turn is activated by a shutter switch 220 located on electrical control panel 222. Accordingly, tether line 200 is an insulated cable carrying six electrical conductors to accomplish the electrical controls as described herein.

Moreover tether line 200 is looped at 201 as seen in FIG. 1 with the ends of the loop fastened to an elastic number 203 which acts as a shock absorber in turbulent conditions so as to assist in the stabilization of the device. Furthermore, tether 200 is tied to a clip 205.

Electrical current from the power source 208 is carried through a ground conductor and a power conductor to the direct current drive motor 6 located in the first motor housing 32 by means of cable 70 and is activated by a double throw, double pole switch 224 located on the control panel 222 so as to control the scanning of the video camera 126 and still camera 128 from left to right; or in other words, to cause the camera mount 86 to rotate about vertical axis 82.

Similarly, electrical power may be supplied to the second or horizontal drive motor 160 by means of tether 200, junction box 215 and through electrical conductor 170 so as to activate second or horizontal motor 160 by means of a double throw, double pole switch 226 so as to cause the lower camera mounting platform 138, video camera 126, and still camera 128 to be displaced up or down; in other words, to rotate about a second or horizontal axis 176.

Tether 200 also includes suitable conductors to carry the video signal from video camera 126 to video display 228 located on electrical control panel 222 so as to permit the user to view the view scanned by the video camera 126.

Once the desired view of video camera 126 is displayed on video display 228, the shutter in the still camera 128 may be controlled by means of shutter switch 220 located on control panel 222.

Suitable light emitting diodes 232 are located in the operator's control panel 222 to indicate the presence or absence of electrical power in the system as the appropriate motors are in operation.

Sufficient tether line 200 is wound on a tether line spool 240 so as to allow the flying helium balloon 10 to reach desired height or altitude. The altitude of helium balloon is restricted only by the distance over which the video signal may be transmitted. Tether line 200 also serves to hold the helium balloon at the desired altitude. The operator's control panel 222 is electrically connected to the tether cable 200 by means of a six electrical conductor quick release jack 242. The other end of tether line 200 is connected to junction box 215 by means of a six conductor quick release jack.

The control device 206 includes shoulder mounts 244 which is adapted to be inserted over the head of the user so that the user may easily manipulate the aerial camera.

Furthermore, power system 208 includes a battery pack 246 which is secured to a belt 248 which is worn around the waist of the user. Alternatively, the electrical power pack 246 may be incorporated as a rechargeable battery into electrical control device 206.

The aerial camera is lightweight which makes it possible for the user to move about freely while wearing the shoulder harness 244 and belt 248 incorporating the power pack 246.

The apparatus as disclosed herein permits the operator to see the image in the video display 228 which corresponds to the image seen by the viewfinder of the still camera 128 and to release the shutter of the still camera 128 at the precise moment when the picture is composed to the satisfaction of the viewer.

The equipment as disclosed herein may be used in order to easily, quickly and inexpensively obtain aerial photographs or may be used for aerial observation as in the case of military maneuvers for security measures or in training exercises.

Furthermore, the equipment as disclosed herein may be used in searches for missing persons and for recording whatever image is captured by a television monitor or video camera for a permanent record. Moreover, at the operator's discretion, still pictures of particularly good quality can be obtained at any time during the process for study at a later date.

Also the use of infer red film in the still camera may provide valuable information indicating the presence of bodies whose temperature may vary from surroundings and show up on such film. Accordingly, it is possible to use pictures taken by using infer red film to study crops and for the study of insulation or heat loss in buildings.

However, the device as described herein has been described in order to secure good quality photographs from a vantage point above the subject for whatever purposes the operator desires. The economy of the operation of the device as disclosed herein is advantageous over obtaining pictures from an airplane which necessitates the burning of fuel.

It should be noted that one filling of the helium balloon 10 will last a considerable length of time restricted only by the condition of the balloon or blimp and requiring only infrequent topping or replacement of gas lost through leakage. While the battery life of the power pack 246 is also sufficient so as to provide savings over conventional methods of obtaining aerial views. The equipment may also be used for recreational or hobby uses or in the artistic field.

The still camera 128 can be controlled to point in any direction selected by the operator as described above, while the self-leveling features as described herein dampens any uncontrolled pitch or yaw of the lower camera mounting platform 138 so as to allow the still camera 128 to maintain a relatively stable horizontal position relative to the helium balloon 10 and to horizon. Furthermore, the self-leveling feature of the apparatus as described herein substantially reduces the movement of the lower camera mounting platform 138 which could occur as a result of the helium balloon pitching, yawing or rotating on its horizontal axis. The self-leveling feature depends on gravity rather than motors or gyroscopes to achieve the desired results with minimum weight and substantial savings in cost of production and ease of use.

Also, the camera mounting 86 can be moved and located anywhere along the cords 12 and 14 as described above which run laterally beneath the helium balloon 10 so that the center of gravity of the helium balloon 10 can be altered by the weight of the still camera 128, video camera 126, tether line 200 and the first and second leveling devices. This is important in achieving stable flight of the helium balloon under a variety of weather conditions.

Moreover, the device as described herein may be quickly assembled and disassembled and is easily transported while inflated in a suitable truck, van or trailer. When deflated the entire apparatus is easily transported, even on board an aircraft.

Although the preferred embodiment as well as the operation and use have been specifically described in relation to the drawings it should be understood that variations in the preferred embodiment could be achieved by a man skilled in the art without departing from the spirit of the invention. Accordingly, the invention should not be understood to be limited to the exact form revealed by the drawings.

The embodiments of a the invention in which an exclusive property or privilege is claimed ar defined as follows:

1. In an aerial viewing device including:
   (a) video camera means;
   (b) means for elevating said video camera means relative to ground level;
   (c) means for suspending said video camera means from the said elevating means
   (d) first self-leveling means for leveling said video camera means in a first direction;
   (e) second self-leveling means for leveling said video camera means in a second direction;
   (f) first drive means for rotating said video camera means to control the image scanned by said video camera means along a first axis;
   (g) drive means for rotating said video camera means to control the image scanned by said video camera means along a second axis;
   (g) second drive means for rotating said video camera means to control the image scanned by said video camera means along a second axis;
   (h) tether means attached at one end to said elevating means for holding said elevating means and said video camera means in said elevated position, said tether means including electrical conductor means;
   (i) and electrical control means attached to another end of said tether means for controlling said first and second drive means so as to control the image scanned by said video camera means, said control means further including video display means for displaying said image scanned by said video camera means.

2. In an aerial viewing device as claimed in claim 1 wherein said elevating means comprise a kite.

3. In an aerial viewing device as claimed in claim 1 wherein said elevating means comprise helium balloon means.

4. In an aerial viewing device as claimed in claim 3 wherein said video camera means comprise video infrared camera means for viewing objects in the dark.

5. In an aerial viewing device as claimed in claim 3 wherein said suspension means comprise cords.

6. In an aerial viewing device as claimed in claim 5 wherein said aerial viewing device further includes a still camera means which may be activated by said electrical control means.

7. In an aerial camera including:
   (a) helium balloon means;
   (b) gimbal frame means suspended from said balloon means;
   (c) camera mounting means suspended from said gimbal frame means;
   (d) still camera means carried by said camera mounting means;
   (e) video camera means carried by said camera mounting means;
   (f) said gimbal frame means including:
      (i) first self-leveling means for leveling said camera mounting means in a first horizontal position
      (ii) second self-leveling means for leveling said camera mounting means in a second vertical position
   (g) first drive means carried by said gimbal frame means for rotating said camera mounting means and said still camera means and for rotationally controlling the image scanned by said video camera means along a vertical axis;
   (h) second drive means associated with said camera mounting means for rotating said still camera means and for rotationally controlling the image scan by said video camera means along a horizontal axis;
   (i) tether means attached to said helium balloon means for holding said balloon means in said elevated position, said tether means including electrical conductor means;
   (j) electrical control means attached to another end of said tether means for controlling said first and second drive means for controlling said first and second drive means so as to control the image scanned by said video camera means, said electrical control means including;
      (i) video display means for displaying said image scanned by said video camera means
      (ii) shutter activating means for activating said still camera means when said video display means displays a desired view from said video camera means.

8. In an aerial camera as claimed in claim 7 wherein said still camera means photographs substantially the same view scanned by said video camera means.

9. In an aerial camera as claimed in claim 8 including means for connecting and disconnecting said camera mounting means from said gimbal frame means.

10. In an aerial camera as claimed in claim 9 wherein said first drive means are housed in first motor housing means.

11. In an aerial camera as claimed in claim 10 wherein said first self-leveling means includes a first pair of gimbal wire means attached to said gimbal frame means and wherein said pair of gimbal wire means are received by aperture means presented by said first motor housing means for relative slidable movement therebetween.

12. In an aerial camera as claimed in claim 11 wherein said first motor housing means includes nylon slip bearing means pivotally connected to said first motor housing means adjacent each said aperture means, and wherein said first nylon slip bearing means are adapted to receive said first pair of gimbal wire means for relative slidable movement therebetween so as to minimize snagging of such first pair of gimbal wire means with said first motor housing means.

13. In an aerial camera as claimed in claim 12 wherein said second self-leveling means includes:
   (a) a second pair of gimbal wire means depending from said first motor housing means;
   (b) second nylon slip bearing means connected to said camera mounting means and adapted to receive said second pair of gimbal wire means for slidable relative movement therebetween so as to minimize snagging of said second pair of gimbal wire means with said second nylon slip bearing means.

14. In an aerial camera as claimed in claim 13 wherein said first drive means includes:
(a) first electrical motor means;
(b) first sprocket means driven by said first electrical motor means;
(c) first gear means engageable with said first sprocket means so as to rotate said camera mounting means along a vertical axis when said sprocket means is activated by said first electrical motor means.

15. In an aerial camera as claimed in claim 14 wherein said second drive means include:
(a) second electrical motor means;
(b) second sprocket means driven by said second electrical motor means;
(c) second gear means engageable with said second sprocket means so as to rotate said still camera means and said video camera means along a horizontal axis when said second sprocket means is activated by said second electrical motor means.

16. In an aerial camera including:
(a) helium balloon means;
(b) gimbal frame means suspended from said balloon means;
(c) a first pair of gimbal wire means depending from said gimbal frame means;
(d) a first motor housing means presenting first aperture means adapted to receive said first pair of gimbal wire means for relative slidable movement therebetween, said first motor housing means presently first nylon slip bearing means, pivotally connected adjacent each said aperture means for relative slidable movement therebetween so as to self-level said first motor housing means in a horizontal position;
(e) camera mounting means;
(f) first drive means carried by said first motor housing means;
(g) means for connecting said camera mounting means to said first drive means for rotating said camera mounting means in a vertical axis when driven by said first drive means;
(h) said connecting means including a second pair of gimbal wire means;
(i) second nylon slip bearing means pivotally connected to said camera mounting means and adapted to slidingly receive said second pair of gimbal wire means for relative slidable movement therebetween so as to self-level said camera mounting means in a second horizontal position;
(j) still camera means connected to said camera mounting means;
(k) the video camera means connected to said camera mounting means;
(l) second motor housing means associated with said camera mounting means for rotating said still camera means and said video camera means along a horizontal axis;
(m) tether means attached at one end to said helium balloon means for holding said helium balloon means in an elevated position, said tether means including electrical conductor means;
(n) electrical control means attached at another end of said tether means for controlling said first and second drive means so as to control the image scanned by said video camera means, said control means including:
  (i) video display means for displaying said image scanned by said video camera means;
  (ii) shutter activating means to activate said still camera means when said video display means displays a desired view from said video camera means.

17. In an aerial camera as claimed in claim 16 wherein said control means includes means for activating said first drive means so as to rotate said camera mounting means, video control means and said still camera means along a vertical axis.

18. In an aerial camera as claimed in claim 17 wherein said electrical control means includes means for rotating said camera mounting means, said video camera means, and said still camera means along a horizontal axis.

19. In an aerial camera as claimed in claim 18 wherein said electrical control means is carried by a shoulder harness.

20. In a self-leveling device for suspending an aerial camera therefrom including:
(a) gimbal frame means adapted to be attached to an elevating device;
(b) first pair of gimbal wire means depending from said gimbal frame means;
(c) first housing means presenting first aperture means adapted to receive said first pair of gimbal wire means for relative slidable movement therebetween;
(d) first nylon slip bearing means pivotally connected adjacent each set of aperture means and adapted to receive said first pair of gimbal wire means for relative slidable movement therebetween so as to self-level said first housing means in a first horizontal position;
(e) camera mounting means for mounting said aerial camera;
(f) means for connecting said camera mounting means to said first housing means;
(g) A second pair of gimbal wire means depending from said connecting means;
(h) second nylon slip bearing means pivotally connected to said camera mounting means and adapted to slidably receive said second pair of gimbal wire means for relative slidable movement therebetween so as to self-level said camera mounting means in a second horizontal position.

* * * * *